(12) United States Patent
Chen et al.

(10) Patent No.: US 12,059,809 B2
(45) Date of Patent: Aug. 13, 2024

(54) SWARM AUTONOMY SYSTEM AND METHOD

(71) Applicant: FAROBOT INC., New Taipei (TW)

(72) Inventors: Chia-Pang Chen, New Taipei (TW); Eduardo Munera Sanchez, Madrid (ES)

(73) Assignee: FAROBOT INC., New Taipei (TW)

( * ) Notice: Subject to any disclaimer, the term of this patent is extended or adjusted under 35 U.S.C. 154(b) by 442 days.

(21) Appl. No.: 17/519,275

(22) Filed: Nov. 4, 2021

(65) Prior Publication Data

US 2023/0138725 A1 May 4, 2023

(51) Int. Cl.
*B25J 9/16* (2006.01)
*B25J 13/00* (2006.01)
*G05B 19/418* (2006.01)

(52) U.S. Cl.
CPC .......... *B25J 9/1669* (2013.01); *B25J 9/1661* (2013.01); *B25J 9/1679* (2013.01); *B25J 13/006* (2013.01); *G05B 19/41865* (2013.01); *G05B 2219/34418* (2013.01); *G05B 2219/39146* (2013.01)

(58) Field of Classification Search
CPC ...... B25J 9/1669; B25J 9/1661; B25J 9/1679; B25J 13/006; B25J 9/1682; G05B 19/41865; G05B 2219/34418; G05B 2219/39146; G05B 2219/31372
See application file for complete search history.

(56) References Cited

U.S. PATENT DOCUMENTS

| | | | |
|---|---|---|---|
| 2019/0049931 A1* | 2/2019 | Tschirschnitz | G05B 19/4186 |
| 2019/0050269 A1* | 2/2019 | Anderson | G06F 9/5077 |
| 2020/0133307 A1* | 4/2020 | Kelkar | G08G 1/0125 |
| 2020/0220887 A1* | 7/2020 | A.K. | H04L 67/12 |

FOREIGN PATENT DOCUMENTS

TW 202129447 A 8/2021

* cited by examiner

*Primary Examiner* — Kidest Bahta
(74) *Attorney, Agent, or Firm* — ScienBiziP, P.C.

(57) ABSTRACT

A swarm autonomy system and swarm autonomy method for organizing multiple industrial robots to carry out a number of manufacturing tasks comprises a swarm core and at least one swarm fleet, wherein the swarm core is configured to manage the swarm autonomy system and generate a swarm plan; and the swarm fleet is configured to execute a manufacturing execution according to the swarm plan.

17 Claims, 6 Drawing Sheets

SWARM AUTONOMY SYSTEM AND METHOD

FIELD

The subject matter herein generally relates to swarm autonomy.

BACKGROUND

With a development of manufacturing technology, manufacturing environment is becoming more complex. In order to coordinate industrial robots in a production process, a heterogeneous group management is often used to manage different types of industrial robot groups. However, the current heterogeneous group management lacks flexibility so that it causes some problems to adapt to complex industrial production environment.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 1:
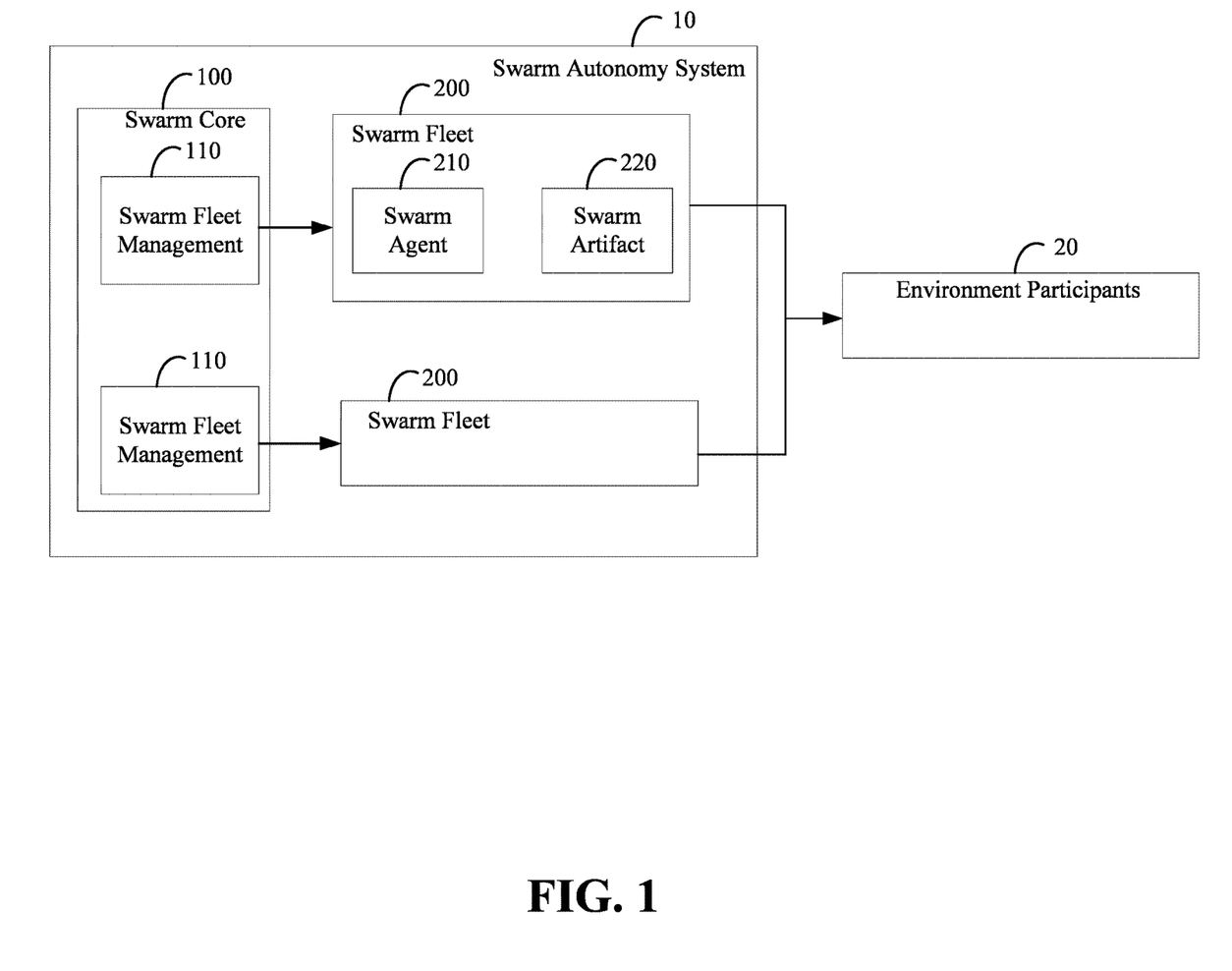
FIG. 1 is a diagram of an embodiment of a swarm autonomy system according to a present invention.

FIG. 1 illustrates a swarm autonomy system 10 in one embodiment. The swarm autonomy system 10 is connected to environment participants 20. The environment participants 20 include all the physical elements existing in the manufacturing environment that cannot be controlled as part of the swarm autonomy system 10. In one embodiment, the environment participants 20 includes factory goods, human operators, and locational and architectural features.

The swarm autonomy system 10 is a system with awareness, solidarity, and dynamic configuration. The swarm awareness of the manufacturing execution scenario is achieved by a swarm protocol and quality of service policies which are in relation to a delivery time, frequency, and acceptable value ranges of relevant information. The solidarity is in relation to the contribution of every swarm participant being properly defined through the capability, swarm roles, and swarm failure avoiding routines. The dynamic configuration is in relation to the ability of the swarm autonomy system 10 to adjust to the system topology according to a reflected information.

In this embodiment, the swarm autonomy system 10 includes a swarm core 100 and at least one swarm fleet 200.

The swarm core 100 is a software (SW) platform that can be executed by any hardware (HW) devices. The hardware devices satisfy certain computation and network connection requirements based on the swarm autonomy system 10.

The swarm core 100 manages at least one swarm fleet 200. The swarm core 100 includes at least one swarm fleet management 110. Each swarm fleet management 110 is configured to manage one swarm fleet 200. The swarm fleet management 110 is designed as a software module or a hardware unit based on the framework of the swarm core 100.

In this embodiment, the swarm fleet 200 includes at least one swarm agent 210 and at least one swarm artifact 220. The swarm agents 210 are all the robots in the swarm autonomy system 10. These robots can be different in terms of hardware and software. The swarm agent 210 can transmit and receive data through a swarm protocol 31 (shown in FIG. 2). The swarm agent 210 follows and executes a swarm plan 120 (shown in FIG. 3).

The swarm artifacts 220 are all the devices in the swarm autonomy system 10 except for robots. The swarm artifacts 220 can be different in terms of hardware and software. The swarm artifacts 220 can transmit and receive data through the swarm protocol 31 (shown in FIG. 2). The swarm artifacts 220 follows and executes the swarm plan 120 (shown in FIG. 3).

The swarm fleet management 110 is easily deployed to manage the swarm agent 210 and the swarm artifact 220. The swarm fleet management 110 is further configured to manage a swarm resolution group 230 (shown in FIG. 2), wherein the swarm resolution group 230 is defined by the swarm core 100 and can be achieved by a group of configuration user interfaces (UI) and tools. The swarm fleet management 110 includes a swarm agent configuration and a swarm artifact configuration which is configured to configure the swarm agent 210 or the swarm artifact 220.

Figure 2:
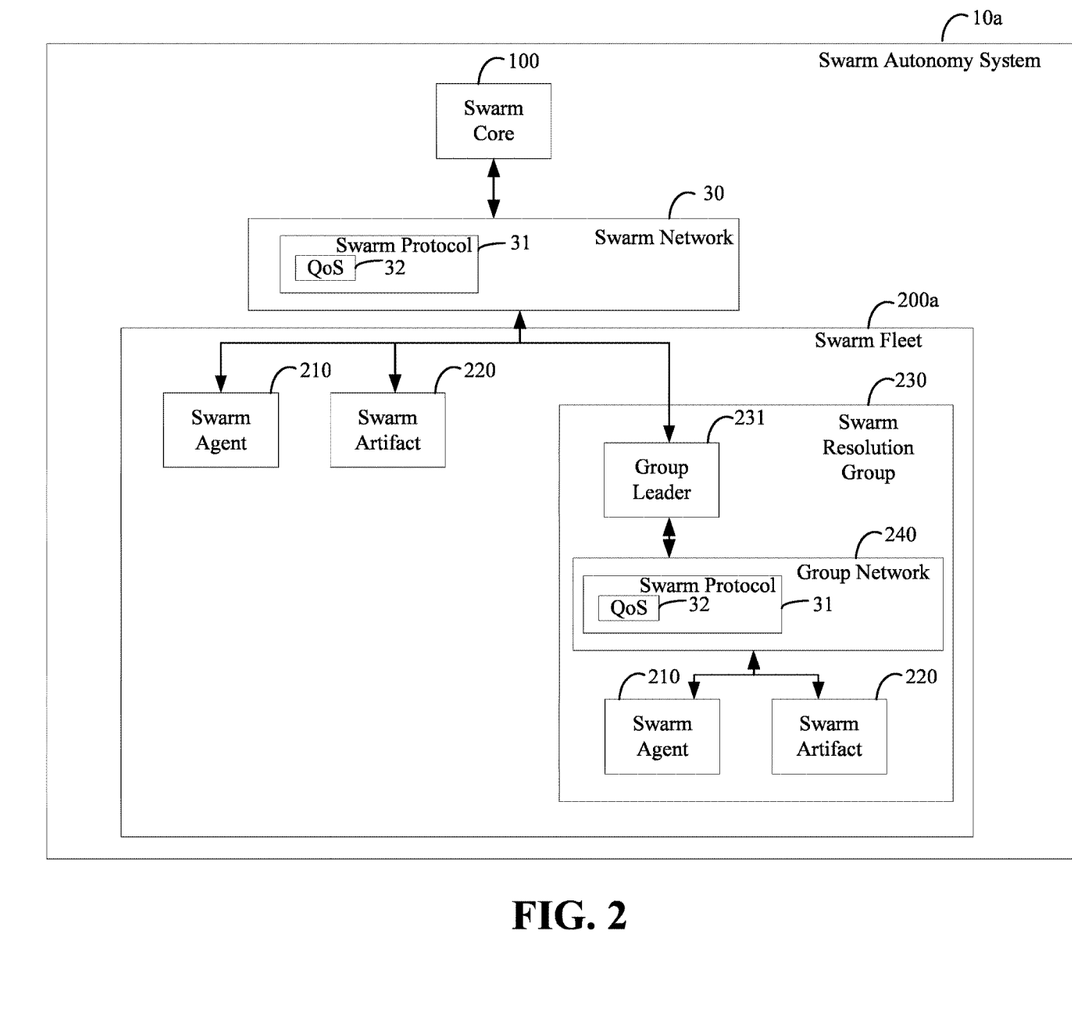
FIG. 2 is a diagram of another embodiment of a swarm autonomy system according to the present invention.

FIG. 2 illustrates another embodiment of a swarm system (swarm autonomy system 10a). The swarm autonomy system 10a includes a swarm core 100 and at least one swarm fleet 200a. The swarm core 100 manages the swarm fleet 200a. As shown in FIG. 2, the swarm autonomy system 10a differs from the swarm autonomy system 10 of FIG. 1 in that the swarm autonomy system 10a also includes a swarm network 30 and the swarm fleet 200a further includes the swarm resolution group 230.

As illustrated in FIG. 2, in this embodiment, the swarm network 30 includes the swarm protocol 31. The swarm resolution group 230 includes a group leader 231, a group network 240, at least one swarm agent 210, and at least one swarm artifact 220. The group network 240 includes the swarm protocol 31. The group leader 231 is configured to exchange execution information between at least one swarm member that are outside the swarm resolution group 230, wherein the at least one swarm member comprises the swarm core, the at least one swarm agent, and the at least one swarm artifact.

In this embodiment, interaction between devices within the swarm autonomy system 10 is based on the swarm protocol 31 of the swarm network 30. The swarm network 30 connects the swarm core 100 and the swarm fleet 200a, which allows data communication between the swarm core 100 and the swarm fleet 200a based on the swarm protocol 31. The definition of data types within the swarm protocol 31 is as follows.

Operational data: the operational data is the execution data generated by the swarm core 100. The operational data is used to control the swarm agent 210 and the swarm artifact 220 to carry out an operation.

Planning data: the planning data is generated by a certain type of swarm artifact 220 according to a manufacturing execution system (MES), an enterprise resource planning (ERP), or a warehouse management system (WMS). Planning data controls the swarm core 100 to generate corresponding operational data. In this embodiment, the planning data is data related to planning requirements, resource allocation, and execution organizations.

Monitor data: the monitor data is generated by any swarm participant to be monitored by a certain type of swarm artifact 220. The monitoring data defines all the information related to device status, the manufacturing operation, and the industrial environment.

Configuration data: the configuration data is generated by a certain type of swarm artifact 220 defining the parameters of each swarm agent 210 and swarm artifact 220 and swarm core 100 within the swarm autonomy system 10a.

The swarm protocol 31 further includes Quality of Service (QoS) 32. The swarm protocol 31 defines different QoS 32 policies according to the network requirement of the operational data, the planning data, the monitor data, and the configuration data. The QoS defines network requirement including but not limited to a throughput, delay, and loss requirement. For example, the swarm protocol 31 can define a QoS 32 policies of the monitor data with zero loss tolerance requirement with a low throughput requirement for the monitor data, and a low loss tolerance requirement with a high throughput requirement for the operational data.

A data interaction under the swarm protocol 31 can be either active or passive. The data may be shared by one participant to another participant regardless of whether the other participant initiates a request for interaction. The interaction in relation to active data can be carried out in a timing mode or triggered based on a task. A passive data interaction requires another participant to issue specific request information to trigger data interaction. The data exchange process through the swarm protocol 31 is described as data domain interaction, while the application of the swarm failure avoiding routines is described as safety interaction. The application of swarm protocol 31 between the swarm core 100, the swarm agent 210, and the swarm artifact 220 ensures the delivery of awareness in the swarm autonomy.

The swarm autonomy system 10 is a hybrid distributed system. The swarm autonomy system 10 can switch between centralized topology and distributed topology according to execution scenario and status of network. When the swarm autonomy system 10 is centralized topology, all of the swarm agents 210 and the swarm artifacts 220 in the swarm autonomy system 10 are managed by the swarm core 100 directly. The swarm autonomy system 10 acts as centralized topology on the normal execution scenario and the network status. All the swarm agents 210 and the swarm artifacts 220 need to transfer data to the swarm core 100 and the swarm core sends the execution information to the swarm agent 210 or the swarm artifact 220 directly, which reduces overall communication overhead of the swarm autonomy system 10.

When the swarm autonomy system 10 is distributed topology, the swarm autonomy system 10 can establish a swarm resolution group 230 by selecting certain swarm agents 210 and swarm artifacts 220 in the swarm fleet 200a according to the execution scenario and the network status. The swarm resolution group 230 is a subgroup of the swarm fleet 200a, and the swarm resolution group 230 is configured for manufacturing execution under adverse execution scenarios or network status. The communication between the at least one swarm member within the swarm resolution group 230 is configured as a distributed topology.

The swarm resolution group 230 selects a swarm agent 210 or a swarm artifact 220 as a group leader 231. In the swarm resolution group 230, the group leader 231 passes execution information with the swarm agent 210 or the swarm artifact 220 of the swarm member outside of the swarm resolution group 230. The group leader 231 receives an execution information outside the swarm resolution group 230. The group leader 231 transmits the execution information to the swarm agent 210 or the swarm artifact 220 according to the type of the execution information. In the swarm resolution group 230, the swarm agent 210 and the swarm artifact 220 are under distributed topology except for the group leader 231. The swarm agent 210 and the swarm artifact 220 in the swarm resolution group 230 can utilize the execution information to execute manufacturing task.

The swarm core 100 can be used to avoid swarm failure. The method of avoiding swarm failure is also known as swarm fail-safe policy. The swarm core 100 detects participant failure, operation failure, and network failure through the swarm protocol 31. The participant failure, operation failure, or network failure can be indicated by diverse computation or communication problems. The swarm core 100 can define different types of swarm failure through the swarm protocol 31 and execute a corresponding recovery. The swarm failure types are shown as follow.

Participant failure: The swarm core 100 can detect failures of the swarm participants according to the swarm protocol 31. The participant failure can be led by failure events including but not limited to the swarm agent being abruptly shut down or disconnected. A swarm task recalculation is carried out to adapt and recover the participant failure.

Operation failure: The operational failure can be led by computational failures of the swarm core 100. The swarm autonomy system 10a can detect the computational failures of the swarm core 100 according to the swarm protocol 31. The computational failures may be led by failure events including but not limited to the centralized data calculation in the swarm core 100, which reaches the bottleneck of the swarm core 100. The swarm autonomy system 10a can establish at least one swarm resolution group 230 after detecting the operational failure. The swarm agent 210 and the swarm artifact 220 in the swarm resolution group 230 take over calculations within the swarm fleet 200a, which reduces data calculation in the swarm core 100.

Network failure: The swarm core 100 can detect the network failures according to the swarm protocol 31. The network failure can be led by network coverage or network congestion. The swarm autonomy system 10a can establish at least one swarm resolution group 230 to avoid network failure. The transfer of execution data within the swarm resolution group 230 can distribute or re-distribute the network load and bridge data from swarm participants out of network coverage.

The application of swarm protocol 31 between swarm participants guarantees awareness of the swarm autonomy system 10a. The awareness guarantees that the information providing awareness is available to every swarm participant within the swarm autonomy system 10a.

Figure 3:
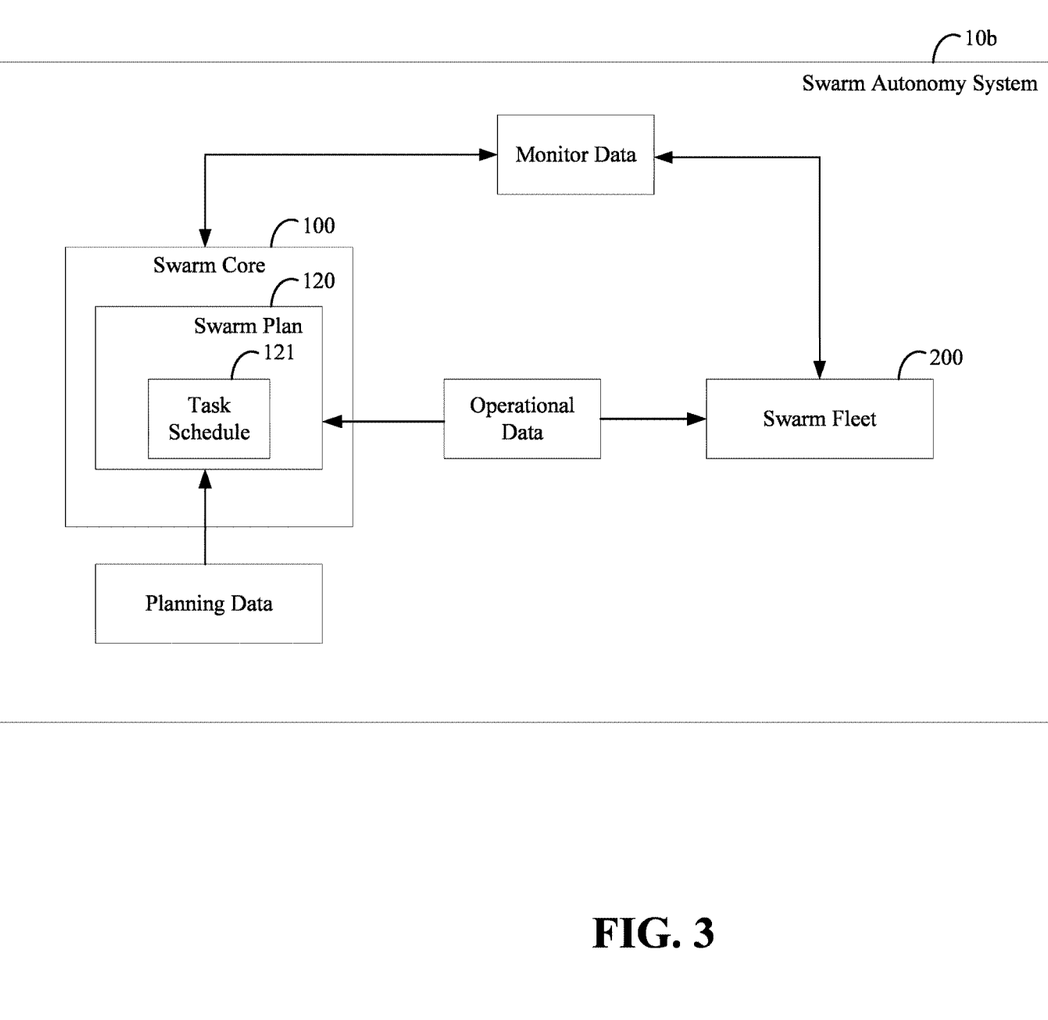
FIG. 3 is a diagram of another embodiment of a swarm autonomy system according to the present invention.

FIG. 3 illustrates another embodiment of the swarm autonomy system 10b. The swarm autonomy system 10b includes a swarm core 100 and at least one swarm fleet 200. The swarm core 100 includes a swarm plan 120 and the swarm plan 120 include a task schedule 121.

The swarm core 100 is configured to generate a first configuration of the swarm plan 120. The first configuration is configured for configuring a set of swarm roles and relationship within the manufacturing execution. The swarm roles include a set of capability requirements that needs to be met by the swarm agent 210 or the swarm artifact 220 to perform the manufacturing operation.

The swarm core 100 is further configured to generate a second configuration of the swarm fleet 200 and swarm participants. The swarm participants include the swarm agents 210 and the swarm artifacts 220 within the swarm fleet 200.

There are many tasks to be performed in industrial production. To improve the efficiency of industrial production, it is necessary to carry out the tasks in timely manner. In the swarm autonomy system 10b, tasks to be executed can be performed quickly through task planning, task prediction, and task recalculation. The swarm autonomy system 10b introduces the swarm plan 120 to schedule the tasks. The swarm plan 120 includes task schedule 121, task forecast, and task recalculation.

The task schedule 121 is a list of manufacturing tasks of the swarm autonomy system 10b. For example, the task schedule 121 can be a task sequence to be executed based on the planning data. The task schedule 121 includes a task sequence to be executed, which can include multiple tasks.

The task forecast includes tasks with respect to the task schedule 121. The task schedule 121 further includes a time or condition relationship between tasks. The swarm autonomy system 10b forecasts tasks based on the relationship and allocates resources according to the relationship. The swarm plan 120 can generate auxiliary preparation tasks according to the task forecast for the swarm core 100, the swarm agent 210 and the swarm artifact 220 to be ready to execute the tasks immediately upon request.

Task recalculation: After detecting a failure from the swarm protocol 31, the swarm autonomy system 10b executes the task re-scheduling and task re-forecasting based on task recalculation.

The application of the swarm plan 120 guarantees execution, to deliver a swarm autonomy solidarity of the swarm autonomy system 10b. The swarm autonomy solidarity guarantees the execution operation for the collective benefit of the swarm autonomy system 10b.

Figure 4:
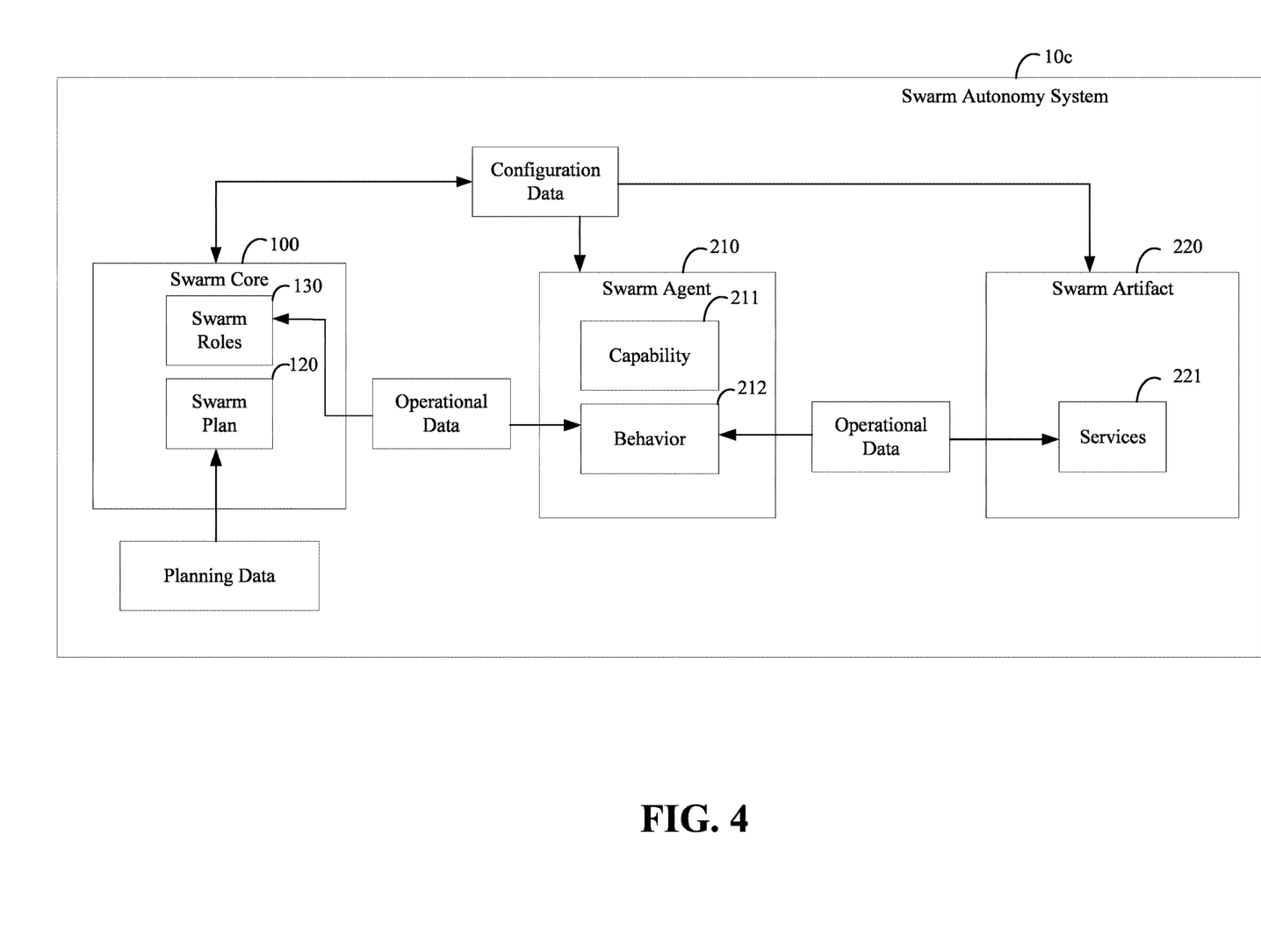
FIG. 4 is a diagram of another embodiment of a swarm autonomy system according to the present invention.

FIG. 4 illustrates another embodiment of the swarm autonomy system 10.

FIG. 4 shows the deployment of the swarm autonomy system 10c. The swarm autonomy system 10c simplifies the operation of an industrial environment by using a swarm fleet 200, the swarm fleet management 110, the swarm protocol 31 support, and the swarm execution definition.

The swarm agent configuration: Each swarm agent 210 can specify a contribution to the swarm fleet 200 by defining a swarm agent statement. The swarm agent statement defines the execution operation capability 211 and behavior 212 of the swarm agent 210. The configuration of the swarm agent 210 is achieved through configuration data exchanged between the swarm core 100 and the swarm agent 210 using the swarm protocol 31.

The swarm artifact configuration: Each swarm artifact 220 can specify a contribution to the swarm fleet 200 by defining a swarm artifact statement. The swarm artifact statement defines the execution operation services 221 provided by the swarm artifact 220. The configuration of the swarm artifact 220 is achieved through configuration data exchanged between the swarm core 100 and the swarm artifact 220 using the swarm protocol 31.

The swarm protocol 31 is a communication protocol that is implemented by all of the swarm core 100, the swarm agents 210, and the swarm artifacts 220 within the swarm autonomy system 10c. The swarm protocol 31 configuration parameters can be set by the swarm core 100 through a group of configuration UIs and tools. The swarm protocol 31 supports both native swarm participants and wrapped swarm participants.

The native swarm participants include all the swarm core 100, the swarm agents 210, and the swarm artifacts 220 that implement the swarm protocol 31, either completely or partially.

Wrapped swarm participants include the swarm core 100, the swarm agents 210, and the swarm artifacts 220 that implement an alternative communication protocol and not the swarm protocol 31. The swarm core 100, the swarm agents 210, and the swarm artifacts 220 need to include a swarm protocol wrapper to translate their original protocol into the swarm protocol 31. Swarm protocol wrappers can be implanted either as a software module or as a combination of software plus hardware.

Swarm execution depends on the configuration of the swarm core 100, the swarm agents 210, and the swarm artifacts 220. The swarm core 100 can establish the task scheduling and task forecasting to perform the swarm execution. The swarm core 100 manages the swarm execution whilst the swarm agent 210 and the swarm artifact 220, organized as the swarm fleet 200, performs the swarm execution. The swarm execution configuration parameters can be set within the swarm core 100 through a group of configuration UIs and tools.

Swarm roles 120 define the swarm execution that can be executed by the swarm agents 210. The swarm execution is defined as sequence of basic operations called behavior 212. The swarm roles 120 specify a set of capabilities 211 as requirements that need to be met by the swarm agent 210 to perform the swarm execution. The capability 211 describes operating abilities and limitations of a specific swarm participant. The swarm core is further configured to obtain a plurality of capabilities of each swarm participants, wherein the plurality of capabilities of each swarm participants comprises a plurality of physical capabilities, a plurality of operation capabilities, and a plurality of perception capabilities. Swarm roles 120 can be used as a template for defining a task. As a result, tasks which are actually to be done give context to the swarm execution defined by the swarm roles 120.

The swarm plan 120 defines batches of tasks defined according to the manufacturing sequence. To achieve that, every swarm plan 120 needs to specify a set of swarm roles 120, an execution context, and a triggering event. Once triggered, swarm plan 120 will automatically generate a batch of tasks according to the specified swarm roles 120 and manufacturing sequence.

Subsequently, the dynamic configuration is achieved by generating the right configuration to fulfill the requirements of the manufacturing process as defined by the swarm plan 120.

Figure 5:
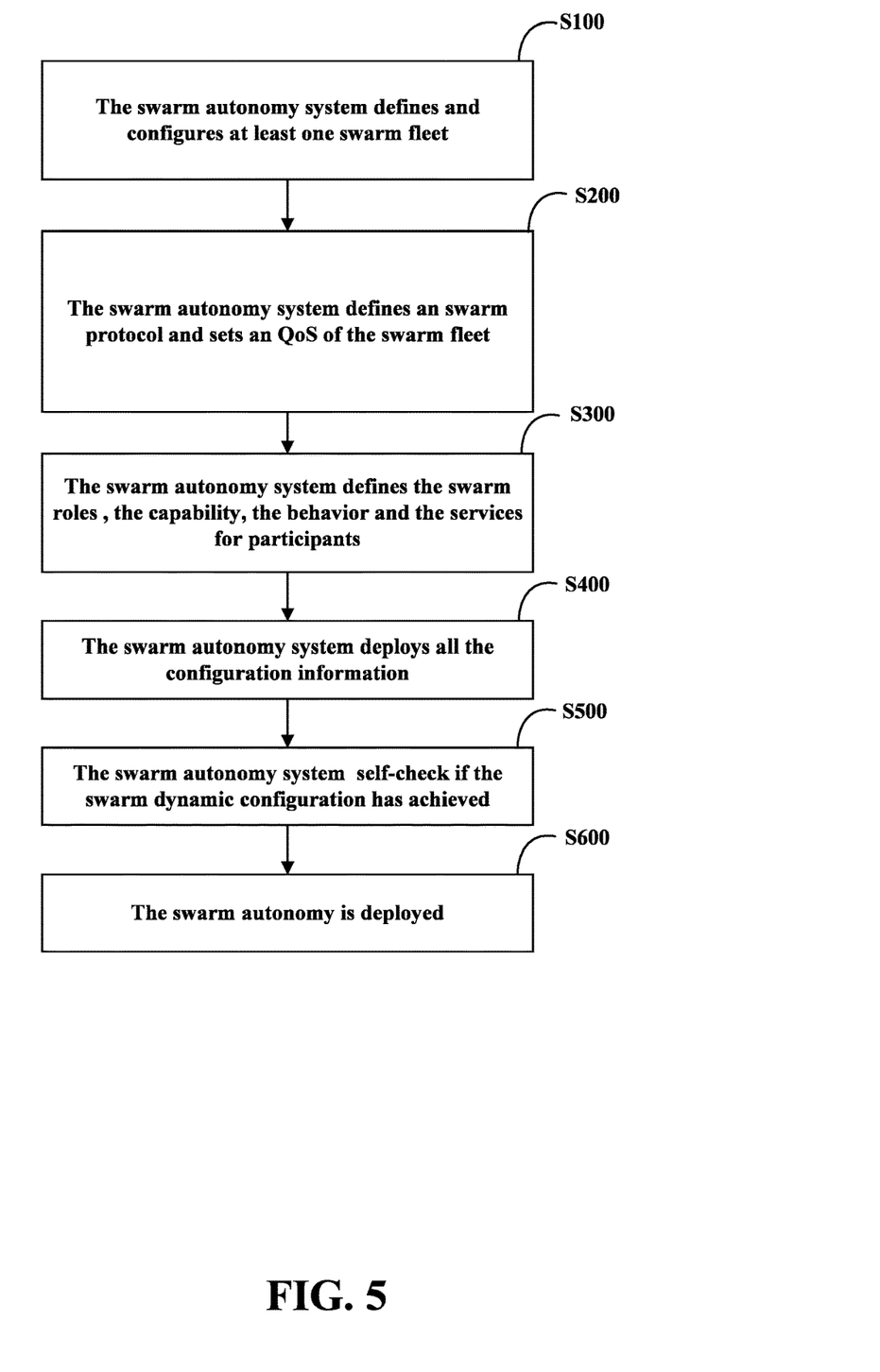
FIG. 5 is a flowchart of an embodiment of a swarm autonomy method according to the present invention.

FIG. 5 illustrates a flowchart of an embodiment of the swarm autonomy deployment method. The embodiment is provided by way of example, as there are a variety of ways to carry out the method. The method described below can be carried out using the configurations illustrated in FIGS. 1-4, for example, and various elements of these figures are referenced in explaining the embodiment. Each block shown in FIG. 5 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. This method can begin at block S100.

At block S100, the swarm autonomy system 10 defines and configures at least one swarm fleet 200, and configure the swarm agent 210 and the swarm artifact 220 within the swarm fleet 200. After the at least one swarm fleet 200 set, the swarm autonomy system 10 self-check if the swarm agent 210 and the swarm artifact 220 are functioning properly.

At block S200, the swarm autonomy system 10 defines the swarm protocol 31 and sets the QoS 32 of the swarm agent 210 and the swarm artifact 220 within the swarm fleet 200. The swarm core 100 configures the wrapper for wrapped swarm participants. The swarm autonomy system 10 self-check if the swarm awareness has been achieved.

At block S300, the swarm autonomy system 10 defines the swarm roles 120, the capability 211, the behavior 212 and the services 221 for the swarm core 100, the swarm agent 210 or the swarm artifact 220. The swarm autonomy system 10 then define the swarm plan 120, the task schedule, the task forecast and the task recalculation during execution. The swarm autonomy system 10 self-check if the swarm solidarity has been achieved.

At block S400, the swarm autonomy system 10 deploys all the configuration information from block S100 to block S300.

At block S500, the swarm autonomy system 10 self-check if the swarm dynamic configuration has been achieved.

At block S600, the swarm autonomy system 10 is deployed.

Figure 6:
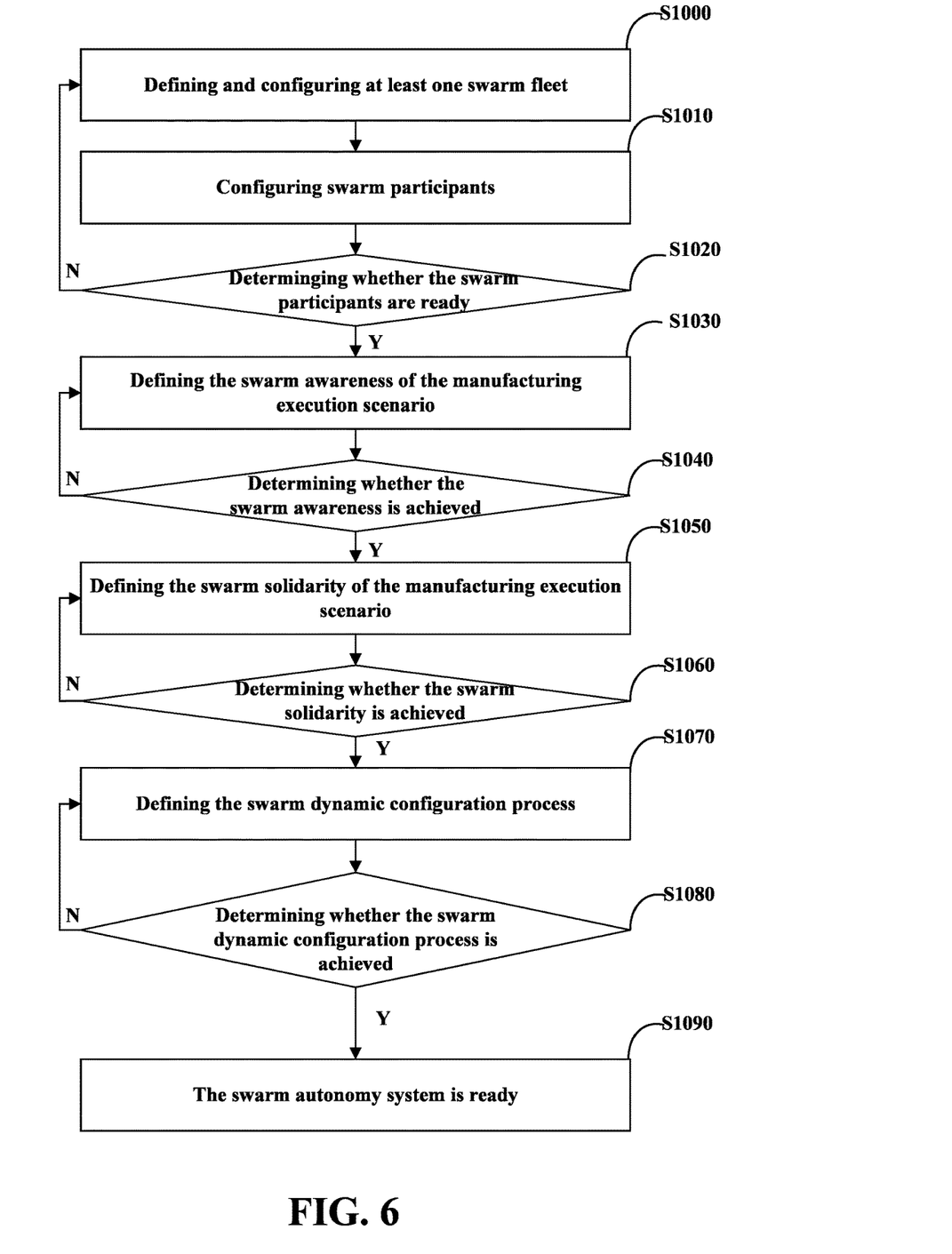
FIG. 6 is a flowchart of another embodiment of a swarm autonomy method according to the present invention.

FIG. 6 illustrates a flowchart of another embodiment of the swarm autonomy deployment method. The embodiment is provided by way of example, as there are a variety of ways to carry out the method. The method described below can be carried out using the configurations illustrated in FIGS. 1-4, for example, and various elements of these figures are referenced in explaining the embodiment. Each block shown in FIG. 6 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. This method can begin at block S1000.

At block S1000, the swarm core 100 defines and configures at least one swarm fleet 200. The at least one swarm fleet 200 includes at least one swarm agent 210. The at least one swarm fleet 200 further includes at least one swarm artifact 220.

At block S1010, the swarm core 100 configures swarm participants. The swarm participants include all the swarm core 100, the swarm agents 210, and the swarm artifacts 220 within the swarm autonomy system 10.

At block S1020, the swarm core 100 determines whether the swarm participants are ready. If the swarm participants are not ready, move back to block S1000 to re-define and re-configure the swarm fleet 200.

At block S1030, the swarm core 100 defines the swarm awareness of the manufacturing execution scenario. The setting of swarm awareness is the same as the process described by the swarm autonomy system 10, which is not described in detail herein.

At block S1040, the swarm core 100 determines whether the swarm awareness is achieved. If the swarm awareness is not achieved, move back to block 1030 to re-define the swarm awareness.

At block S1050, the swarm core 100 defines the swarm solidarity of the manufacturing execution scenario. The setting of swarm solidarity is the same as the process described by the swarm autonomy system 10, which is not described in detail herein.

At block S1060, the swarm core 100 determines whether the swarm solidarity is achieved. If the swarm solidarity is not achieved, move back to block 1050 to re-define the swarm solidarity.

At block S1070, the swarm core 100 defines the swarm dynamic configuration process. The setting of swarm dynamic configuration process is the same as the process described by the swarm autonomy system 10, which is not described in detail herein.

At block S1080, the swarm core 100 determines whether the swarm dynamic configuration process is achieved. If the swarm solidarity is not achieved, move back to block 1070 to re-define the swarm dynamic configuration process.

At block S1090, the swarm autonomy system 10 is set ready. The configuration of the swarm autonomy system 10 is finished, and the awareness, solidarity, and dynamic configuration of the swarm autonomy system 10 is achieved.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A swarm autonomy system applied to an industrial application, the swarm autonomy system comprising a swarm platform and at least one swarm fleet, the at least one swarm fleet comprising at least one swarm agent and at least one swarm artifact, wherein, the swarm platform manages the swarm autonomy system and generate a swarm plan and a first configuration of the swarm plan, wherein the first configuration of the swarm plan configures a set of swarm roles and relationship within a manufacturing execution;

the at least one swarm fleet executes the manufacturing execution according to the swarm plan;

the swarm platform further generates a second configuration of the at least one swarm fleet and swarm participants within, wherein the swarm participants comprise swarm agents and swarm artifacts; and the swarm platform communicates with the at least one swarm agent and the at least one swarm artifact through a swarm protocol, wherein the swarm protocol transmits an operational data, a planning data, a monitor data, and a configuration data between the swarm platform, the at least one swarm agent, and the at least one swarm artifact.

2. The swarm autonomy system of claim 1, wherein the swarm protocol comprises a quality of service policies, wherein the quality of service policies defines network requirement of the operational data, the planning data, the monitor data, and the configuration data.

3. The swarm autonomy system of claim 2, wherein the swarm platform also avoids swarm failure, wherein the swarm failure comprises participant failure, operation failure, and network failure.

4. The swarm autonomy system of claim 3, further comprising a swarm resolution group, wherein the swarm resolution group is defined by the swarm platform, the swarm resolution group is defined as a subgroup of the swarm fleet, and the swarm resolution group manufactures execution under adverse execution scenarios or network status.

5. The swarm autonomy system of claim 4, wherein the swarm resolution group further comprises a group leader, the group leader exchanges execution information between at least one swarm member that are outside the swarm resolution group, wherein the at least one swarm member comprises the swarm platform, the at least one swarm agent, and the at least one swarm artifact.

6. The swarm autonomy system of claim 5, wherein the communication between the at least one swarm member within the swarm resolution group is distributed topology.

7. The swarm autonomy system of claim 1, wherein the swarm plan comprises a task schedule, a task forecast, and a task recalculation;

wherein the task schedule comprises a task list of the manufacturing execution, and the task schedule further comprises relations between tasks;

wherein the task forecast comprises a following task according to the task schedule; and wherein the task recalculation is a task re-schedule and task re-forecast after detecting a failure from the swarm protocol.

8. The swarm autonomy system of claim 1, the swarm autonomy system further comprising a swarm protocol wrapper, wherein the swarm protocol wrapper, connected to the swarm platform, the at least one swarm agent and the at least one swarm artifact, translates its original protocol into the swarm protocol.

9. A swarm autonomy method applied to a swarm autonomy system, the swarm autonomy system comprising a swarm platform and at least one swarm fleet, the at least one swarm fleet comprising at least one swarm agent and at least one swarm artifact, wherein, the method comprises:

managing the swarm autonomy system and generating a swarm plan and a first configuration of the swarm plan, wherein the first configuration of the swarm plan configures a set of swarm roles and relationship within a manufacturing execution;

executing the manufacturing execution according to the swarm plan; and the manufacturing execution scenario involving a flow of awareness, solidarity, and dynamic configuration process;

generating a second configuration of the at least one swarm fleet and swarm participants within, wherein the swarm participants comprise swarm agents and swarm artifacts; and communicating with the at least one swarm agent and at least one swarm artifact through a swarm protocol, wherein the swarm protocol transmits an operational data, a planning data, a monitor data, and a configuration data between the swarm platform, the at least one swarm agent and the at least one swarm artifact.

10. The swarm autonomy method of claim 9, wherein the method further comprising:

defining a swarm awareness of the manufacturing execution scenario, wherein the swarm awareness is achieved by a swarm protocol, a quality of service and an avoiding swarm failure;

determining whether the swarm awareness is achieved;

defining a swarm solidarity of the manufacturing execution scenario, wherein the swarm solidarity is achieved by defining swarm roles, capabilities and the swarm plan;

determining whether the swarm solidarity is achieved;

if the swarm solidarity is achieved, defining a swarm dynamic configuration process, wherein the swarm dynamic configuration process is achieved by deploying configuration of swarm solution;

determining whether the swarm dynamic configuration process is achieved;

if the swarm dynamic configuration process is achieved, the swarm autonomy system is completed.

11. The swarm autonomy method of claim 10, wherein the swarm awareness is further achieved by a swarm protocol wrapper, wherein the swarm protocol wrapper, connected to the swarm platform, the at least one swarm agent or the at least one swarm artifact, translates its original protocol into the swarm protocol.

12. The swarm autonomy method of claim 9, wherein the swarm protocol comprises a quality of service policies, wherein the quality of service policies defines network requirement of the operational data, the planning data, the monitor data and the configuration data.

13. The swarm autonomy method of claim 12, wherein the method further comprises:

avoiding swarm failure, wherein the swarm failure comprises participant failure, operation failure, and network failure.

14. The swarm autonomy method of claim 10, wherein the method further comprises:

setting up a swarm resolution group, wherein the swarm resolution group is defined by the swarm platform, the swarm resolution group defined as a subgroup of a swarm fleet, and the swarm resolution group manufactures execution under adverse execution scenario or network status.

15. The swarm autonomy method of claim 14, wherein method further comprises:

setting up a group leader within the swarm resolution group, wherein the group leader is exchanges an execution information between the at least one swarm member that are outside the swarm resolution group, wherein the swarm member comprises the swarm platform, the at least one swarm agents, and the at least one swarm artifacts.

16. The swarm autonomy method of claim 15, wherein method further comprises:
   setting a communication between swarm members within the swarm resolution group into a distributed topology.

17. The swarm autonomy method of claim 9, wherein the method further comprises:
   generating a task schedule, wherein the task schedule comprises a task list of the manufacturing execution, and the task schedule further comprises relations between tasks;
   generating a task forecast, wherein the task forecast comprises a following task according to the task schedule; and
   generating a task recalculation, the task recalculation is a task re-schedule and task re-forecast after detecting a failure from the swarm protocol.

\* \* \* \* \*